United States Patent [19]
Iizuka et al.

[11] Patent Number: 6,045,764
[45] Date of Patent: Apr. 4, 2000

[54] EXHAUST GAS PURIFYING METHOD AND CATALYST USED THEREFOR

[75] Inventors: Hidehiro Iizuka, Tsuchiura; Osamu Kuroda, Hitachi; Toshio Ogawa, Takahagi; Hisao Yamashita; Shigeru Azuhata, both of Hitachi; Yuichi Kitahara, Hitachinaka; Takeshi Atago, Hitachinaka; Hiroatsu Tokuda, Hitachinaka; Takao Ishikawa; Hiroshi Hanaoka, both of Hitachi; Hiroshi Tobita, Kitaibaraki; Shinichi Ichikawa, Mito; Toshifumi Hiratsuka, Hitachinaka, all of Japan

[73] Assignee: Hitachi, Ltd., Tokyo, Japan

[21] Appl. No.: 08/638,811

[22] Filed: Apr. 29, 1996

[30] Foreign Application Priority Data

May 1, 1995 [JP] Japan ................................ 7-107319

[51] Int. Cl.⁷ .................................................. B01D 53/94
[52] U.S. Cl. .................... 423/213.5; 502/304; 502/328
[58] Field of Search ............................. 502/328, 302, 502/303, 304; 423/213.5, 213.7

[56] References Cited

U.S. PATENT DOCUMENTS

| | | | |
|---|---|---|---|
| 4,237,032 | 12/1980 | Evans et al. | 423/213.5 |
| 4,849,398 | 7/1989 | Takada et al. | 423/213.5 |
| 4,921,829 | 5/1990 | Ozawa et al. | 423/213.5 |
| 5,412,945 | 5/1995 | Katoh et al. | 423/213.7 |
| 5,492,878 | 2/1996 | Fujii et al. | 502/304 |
| 5,547,913 | 8/1996 | Muramoto | 423/213.2 |

FOREIGN PATENT DOCUMENTS

| | | | |
|---|---|---|---|
| 589393 | 3/1994 | European Pat. Off. | |
| 613714 | 9/1994 | European Pat. Off. | |
| 53-019986 | 2/1978 | Japan | 502/303 |
| 3-072950 | 3/1991 | Japan | 502/304 |

*Primary Examiner*—Steven P. Griffin
*Assistant Examiner*—Peter DiMauro
*Attorney, Agent, or Firm*—Antonelli, Terry, Stout & Kraus, LLP

[57] ABSTRACT

An exhaust gas purifying catalyst is provided for purifying NOx contained in an exhaust gas from an internal combustion engine of a vehicle operated at a high air fuel ratio due to excessive oxygen, using unburnt HC or CO in the exhaust gas as a reducing agent. The catalyst comprises platinum, strontium and a rare earth metal, as active components, each supported on a support of inorganic oxide. The active components of the catalyst include platinum of 0.01–3.7 by wt ratio, strontium of 0.01–55 by wt ratio and a rare earth metal of 0.01–36 wt ratio, per the inorganic oxide of 100 by wt ratio.

6 Claims, 3 Drawing Sheets

EXHAUST GAS PURIFYING METHOD AND CATALYST USED THEREFOR

BACKGROUND OF THE INVENTION

The present invention relates to a method of purifying exhaust gas emitted from internal combustion engines of vehicles by the action of a catalyst. More particularly, the present invention relates to an exhaust gas purifying method which is suitable for removing nitrogen oxides contained in an exhaust gas emitted when the internal combustion engine operates at a high air fuel ratio at which the fuel mixture is lean due to excessive oxygen.

Exhaust gas emitted from internal combustion engines of vehicles contains oxides, including nitrogen oxides, which are harmful to humans and cause environmental damage via such phenomenon as acidic rain. Therefore, various studies have been conducted into a method of purifying nitrogen oxides in exhaust gas.

At present, the air fuel ratio A/F (a ratio by weight of air A to fuel F) in gasoline engines for vehicles is set to about a stoichiometric ratio (A/F=14.5), and exhaust gas produced therefrom is purified by reducing nitrogen oxides to nitrogen and by oxidizing hydrocarbons and carbon monoxide, using a three-way catalyst having noble metals (rhodium, palladium platinum) as its main components.

Furthermore, concerning automobiles, recently, there has been significant development in lean burn engines in which the air fuel ratio is made larger than the stoichiometric ratio (A/F 14.5) to reduce fuel consumption, and such lean burn characteristics are expected to be used widely in the future. However, since a lean burn engine emits exhaust gas which contains oxygen of 0.5 vol % or more (hereunder, exhaust gas which contains 0.5 vol % or more oxygen is referred to as an oxygen containing exhaust gas), during purification of the exhaust gas by the three-way catalyst used at present, oxidization of hydrocarbons and carbon monoxide mainly occurs, but it is impossible to effectively reduce the nitrogen oxides.

Current diesel engines for vehicles operate at a high air fuel ratio having a more excessive level of oxygen than conventional diesel engines. Therefore, the above-mentioned three-way catalyst can not be used for purifying the exhaust gas of such diesel engines. At present, there is a NOx method to effectively reduce nitrogen oxides, but it has a drawback.

One of the current methods of removing nitrogen oxides uses $NH_3$ and a $V_2O_3$—$TiO_2$ catalyst. This method is characterized in that, even if a lot of oxygen coexists with nitrogen oxides in the exhaust gas, the nitrogen oxides can be removed. However, since the method uses $NH_3$ which is a harmful substance and requires a $NH_3$ supply tank, it is difficult to use this method in the internal combustion engines of vehicles, such as automobiles.

Recently, a lot of studies have been made of catalysts for purifying nitrogen oxides with excessive oxygen present, without using $NH_3$. Of those methods, attention has been given to a method of removing nitrogen oxides, making use of hydrocarbons and oxygen contained in the exhaust gas. Of such catalysts at present, there has been reported a catalyst in which copper is supported on zeolite (which is disclosed in JP A 1-151706 and a 70th Shokubai-Toronkai Yokoshu(70th Catalyst-Symposium Preliminary Reports)3F 108 (1992)), a catalyst containing a rare earth metal, copper and/or rhodium (JP A 4-219147), and a catalyst comprising barium oxide, lanthanum or lanthanum oxide and platinum (JP A 5-261287).

However, the above-mentioned catalysts and exhaust gas purifying methods using the catalysts have the following problems.

The catalyst in which copper is supported on zeolite has a peculiar adsorption of nitrogen oxides by the copper, so that it has a high performance in a relatively low temperature zone. However, the temperature zone (temperature window) enabling catalytic action is narrow. Therefore, a study has been made to find a way of expanding the temperature window, and a catalyst including cobalt, a rare earth metal, copper, and rhodium in addition to zeolite, for example, has been proposed. However, zeolite-based catalysts have the problem that catalytic activity is lowered with the coexistence of a lot of water. A study has been made of this problem, and a method of improving drastically the resistance of zeolite (which is a support) against water and heat has at present still not been found. A catalyst used for purifying the exhaust gas of internal combustion engines in vehicles operated at a high air fuel ratio, as in lean burn engines, has to achieve a high nitrogen oxide purifying performance, in a wide temperature zone, and also has to have a high durability.

The catalyst, comprising barium oxides, lanthanum oxides and platinum, absorbs nitrogen oxides during the operation time of the lean burn engine and desorbs during the operation time of the engine at a stoichiometric ratio, to reduce the nitrogen oxides. Although the catalyst is based on a clever idea, it has a problem of thermal deterioration.

Further, it is desirable for exhaust gas purifying catalysts to be active both during a lean burn operation time and an operation time at a stoichiometric ratio, that is, to be both effective exhaust gas containing oxygen of more than 0.5 vol % and exhaust gas containing oxygen of 0.5 vol % or less.

SUMMARY OF THE INVENTION

A first object of the present invention is to provide an exhaust gas purifying catalyst and an exhaust gas purifying method which are applicable to even lean burn combustion engines which emit exhaust gas containing oxygen, particularly, to provide an exhaust gas purifying catalyst and an exhaust gas purifying method which are able to effectively reduce nitrogen oxides in an exhaust gas containing oxygen.

A second object of the present invention is to provide an exhaust gas purifying catalyst and an exhaust gas purifying method which are applicable to both exhaust gas containing oxygen and exhaust gas containing little oxygen and, particularly, which are able to effectively reduce nitrogen oxides in both kinds of the above-mentioned exhaust gases.

The present inventors have made an extensive study of catalysts in an effort to achieve the first object. As a result, they found that, an exhaust gas purifying catalyst in which platinum or platinum oxide, strontium oxide and rare earth metal oxides are supported on an inorganic support, or an exhaust gas purifying catalyst in which platinum or platinum oxide, rhodium or rhodium oxide, strontium oxide and rare earth metal oxides are supported on an inorganic support, is an effective solution.

The above mentioned inorganic support can be made of porous metal oxides, such as $Al_2O_3$, $TiO_2$, $SiO_2$, $ZrO_2$, MgO, etc., however, when alumina is used as the support, an excellent nitrogen oxide purifying performance and a relatively high heat resistance can be obtained. Any structure of alumina of α, γ, θ type can be employed, however, γ-alumina is particularly desirable.

Strontium is supported in the form of its oxide, nitrate, carbonate, or chloride. The rare earth metal can be lanthanum, cerium, yttrium, praseodymium, neodymium, etc., but cerium is particularly desirable. Further, rhodium is supported in the form of a metal or its oxide.

In an exhaust gas purifying catalyst in which platinum or platinum oxide, a strontium compound and a rare earth metal oxide are supported on an inorganic support, a desired exhaust gas purifying performance can be attained by supporting platinum of 0.01–3.7 by wt ratio, a rare earth metal of 0.01–36 by wt ratio and strontium of 0.01–55 by wt ratio, per 100 by wt ratio of an inorganic support. However, it is preferable to support platinum of 0.4–3.0 by wt ratio, a rare earth metal of 2.0–33 by wt ratio and strontium of 5.0–47 by wt ratio, per 100 by wt ratio of the inorganic support, and it is particularly even more preferable to support platinum of 0.9–2.6 by wt ratio, rare earth metal of 7.0–28 by wt ratio and strontium of 12–40 by wt ratio, per 100 by wt ratio of the inorganic support.

Further, in an exhaust gas purifying catalyst in which platinum or platinum oxide, a strontium compound and a rare earth metal oxide are supported on an inorganic support, a desired exhaust gas purifying performance can be attained by supporting platinum of 0.01–3.7 by wt ratio, rhodium of 0.02–1.4 by wt ratio, a rare earth metal of 0.01–36 by wt ratio and strontium of 0.01–55 by wt ratio, per 100 by wt ratio of an inorganic support. However, it is preferable to support platinum of 0.4–3.0 by wt ratio, rhodium of 0.02–1.4 by wt ratio, a rare earth metal of 2.0–33 by wt ratio and strontium of 5.0–47 by wt ratio, per 100 by wt ratio of the inorganic support, and it is even more preferable to support platinum of 0.9–2.6 by wt ratio, rhodium of 0.02–1.4 by wt ratio, a rare earth metal of 7.0–28 by wt ratio and strontium of 12–40 by wt ratio, per 100 by wt ratio of the inorganic support.

In production of the above-mentioned exhaust gas purifying catalyst, first of all, the rare earth metal oxide is supported on the inorganic support, then the strontium compound is supported thereon, further platinum or platinum oxide is supported and then if necessary rhodium or rhodium oxides are supported, whereby an exhaust gas purifying catalyst having an excellent exhaust gas purification performance can be attained. As a method of supporting platinum or platinum oxide, rhodium or rhodium oxide, the rare earth metal oxide and strontium compound, a conventional method, such as an impregnation method, a dry or wet kneading method, etc. can be adopted. Further, it is possible to support or impregnate catalytic active components on or in the inorganic support by using a coprecipitation method, a sol-gel method, etc.

A method of production of the above-mentioned exhaust gas purifying catalyst, more specifically, can include the following steps:

impregnating an inorganic support with a rare earth metal compound solution;

calcining the rare earth metal compound-impregnated substance at a temperature at which the above-mentioned rare earth metal compound decompose;

impregnating the calcined rare earth metal compound-impregnated substance with a strontium compound solution, calcining the strontium compound-impregnated substance at a temperature at which the strontium compound decomposes;

impregnating the calcined rare earth metal oxide and strontium containing substance with a platinum compound solution; and calcining the platinum compound-impregnated substance at a temperature at which the platinum compound decomposes.

Each metal compound in this production process can be its nitrate, acetate, chloride, sulfate, carbonate, etc., but the present invention is not limited to those kinds of metal salts.

An exhaust gas purifying catalyst according to the present invention can be used in the form of a powder, particles, pellets, a honeycomb, etc. In the case where the exhaust gas purifying catalyst is used in the form of a honeycomb, a catalyst powder, obtained by supporting a rare earth metal oxide on the above-mentioned inorganic support first of all, then supporting strontium compounds thereon, further supporting platinum or platinum oxide thereon and still further if necessary supporting rhodium or rhodium oxide thereon, is coated on a cordierite of metal honeycomb-shaped catalytic base, whereby a honeycomb catalyst of high performance is prepared obtained.

The second object of the present invention can be achieved by the above-mentioned exhaust gas purifying catalyst obtained by supporting platinum or platinum oxide, a strontium compound and a rare earth metal oxide on an inorganic support, or by combining an exhaust gas purifying catalyst obtained by supporting platinum or platinum oxide, rhodium or rhodium oxide, a strontium compound and rare earth metal oxide on the inorganic support and a other exhaust gas purifying catalyst having a three-way catalytic function.

The above-mentioned exhaust gas purifying catalyst obtained by supporting platinum or platinum oxide, a strontium compound and a rare earth metal oxide on an inorganic support or the exhaust gas purifying catalyst obtained by supporting platinum or platinum oxide, rhodium or rhodium oxide, a strontium compound and a rare earth metal oxide on the inorganic support has a high nitrogen oxide purifying ability at a temperature of 300° C. or higher around a stoichiometric ratio 14.5. In order to purify exhaust gas at a stoichiometric ratio, it is necessary to carry out the nitrogen oxide purifying process at a temperature of 300° C. or lower.

In order to solve this problem, in accordance with the present invention, as mentioned above, two kinds of exhaust gas purifying catalysts are combined. The latter exhaust gas purifying catalyst to be combined can be a three-way catalyst used at present or a catalyst containing noble metals, such as platinum, rhodium, palladium, etc., which are main components of the three-way catalyst used at present, and a rare earth metal, such as cerium etc. However, catalysts which include platinum or platinum oxide, rhodium or rhodium oxide, magnesium oxide and cerium oxide are preferable. Of those catalysts, a preferable catalyst is one in which, on an inorganic support such as alumina, cerium oxide is supported first of all, then platinum or platinum oxide is supported, and then rhodium or rhodium oxide and finally magnesium oxide are supported. A weight ratio of both exhaust gas purifying catalysts to be combined is preferably in a range of 1:4, to 4:1, and more preferably in a range of 1:2 to 2:1. When more of one of the two kinds of exhaust gas purifying catalysts is used beyond the range, the characteristic of the one kind used beyond the range prevails, and an effect of the combination becomes small.

An exhaust gas purifying catalyst, including platinum or platinum oxide, rhodium or rhodium oxide, magnesium, and cerium oxide, has a NOx purifying ability in a lean burn combustion exhaust gas and the NOx purifying performance in a stoichiometric ratio combustion exhaust gas is also excellent. On the other hand, an exhaust gas purifying catalyst including platinum or platinum oxide, strontium oxide, and a rare earth metal oxide, or an exhaust gas purifying catalyst including platinum or platinum oxide, rhodium or rhodium oxide, a strontium compound and a rare earth metal oxide a is more successful in NOx purifying performance, in a lean burn combustion exhaust gas, than the above-mentioned catalyst including magnesium, but it is less effective in a stoichiometric ratio combustion exhaust gas. Therefore, by combining the two kinds of catalysts, an exhaust gas purifying catalyst can be obtained which is excellent in NOx purifying performance for both a lean burn exhaust gas and a stoichiometric ratio combustion exhaust gas.

Mixing two kinds of catalysts makes it possible to provide a catalyst which includes the both the catalysts, for example. In case of such mixing, a method can be adopted which physically mixes powders of the both the catalysts by adding water or alcohol, etc. to both catalysts and then effecting wet kneading and dry kneading, using an automatic mortar, a ball mill, etc. As another method, it is possible to include both catalyst components by coating a honeycomb shaped catalyst base made of cordierite, etc. with one of the two catalysts and then coating it with the other catalyst.

Although the reaction mechanism of the exhaust gas purifying catalyst according to the present invention is not clear, the following may be considered. Further, the exhaust gas purifying catalyst according to the present invention has a sufficient purifying function with respect to hydrocarbons and carbon monoxide, but the present specification explains only a purifying operation with respect to nitrogen oxides.

When an exhaust gas purifying catalyst is made so that an alkaline earth metal and platinum or a platinum oxide coexist on an alumina support, the nitrogen oxide purifying ability is improved greatly, compared with an exhaust gas purifying catalyst in which platinum or platinum oxide only exists on the support. This is thought to occur because the alkaline earth metal has an ability to absorb nitrogen oxides.

Of combinations of the alkaline earth metal and platinum, it is found that a combination of platinum and strontium has a high nitrogen oxide purifying ability. Since strontium and platinum form a solid solution at a temperature of 700° C. or less, strontium and platinum are apt to exist in an adjacent relation to each other. As a result, platinum has a probability of high dispersion on the support. It is known that nitrogen oxides are adsorbed in alkaline earth metals including strontium. It is thought that the nitrogen oxides adsorbed an strontium are moved onto platinum in an adjacent relation to react with a hydrocarbon, whereby the nitrogen oxides are purified.

A rare earth metal can be expected generally to have an effect of improving the heat resistance and the durability of a catalyst, and it is known that a rare earth metal influences the catalytic activity. Of a combinations of rare earth metal and the above-mentioned strontium-platinum, it is found that a combination of cerium or lanthanum and strontium-platinum has a good catalytic activity. Cerium has an effect of oxygen storage, and so it is thought that a platinum surface is kept active by the action of taking in oxygen adsorbed on the platinum.

In the catalyst according to the present invention, it is understandable that an effect of the alkaline earth metal represented by strontium and an effect of the rare earth metal represented by cerium react mixedly with each other to have a high nitrogen oxide purifying ability.

The reason why the exhaust gas purifying catalyst according to the present invention carries out a high nitrogen oxide purifying performance under coexistence is believed to be due to the fact that hydrocarbons acting as a reducing agent of nitrogen oxides are suppressed so as to be lost through combustion. The suppression of combustion of hydrocarbons is equivalent to a rise in the combustion temperature of the hydrocarbons, which results in raising the temperature at which a three-way catalyst acts.

Therefore, by combining an exhaust gas purifying catalyst in which platinum or platinum oxide, strontium oxide and rare earth metal oxides are supported on an inorganic support, or an exhaust gas purifying catalyst in which platinum or platinum oxide, rhodium or rhodium oxide, a strontium compound and a rare earth metal oxide are supported on an inorganic support, with a catalyst having a three-way catalytic function effected at a temperature of 200° C. or more in an exhaust gas containing little oxygen, nitrogen oxides are purified by a function of the former catalyst when the combination contacts comes into contact with an exhaust gas containing oxygen. Although combustion of hydrocarbons as a reducing agent proceeds by the action of the latter catalyst, since an amount of hydrocarbons greater than a stoichiometric amount necessary to reduce nitrogen oxides is contained in an exhaust gas from internal combustion engines of vehicles, usually a reduction reaction of nitrogen oxides by the former catalyst proceeds by the action of unburnt hydrocarbons. Further, if the latter catalyst is provided with an ability of reducing nitrogen oxides in oxygen-containing exhaust gas, this ability is further raised when it comes into contact with an exhaust gas containing little oxygen, and the function of the latter catalyst is fully carried out and a reduction function of nitrogen oxides operates from a low temperature of about 200° C. Even in this case, the presence of hydrocarbons as a reducing agent in excess of the stoichiometric amount also is related thereto.

In this manner, in the reaction system which the present invention can be applied to, by combining the two kinds of catalyst, the characteristic of the catalyst according to the present invention prevails in an exhaust gas containing oxygen and the function of the catalyst having a three-way catalytic function as mentioned above prevails in an exhaust gas containing little oxygen, whereby a catalytic function which can not be attained by each individual catalyst can be attained.

Further, the exhaust gas purifying catalyst according to the present invention can be used widely to effectively purify harmful components, particularly nitrogen oxides, not only in combustion exhaust gas from internal combustion engines of vehicles, but in combustion exhaust gas from consumers appliance, such as cooking devices, boilers of factories and power stations.

BRIEF DESCRIPTION OF THE DRAWINGS

FIG. 6 is a graph showing a change in NOx removal rate when a stoichiometric model exhaust gas and lean model exhaust gas alternately flow in.

DESCRIPTION OF THE EMBODIMENTS

Figure 1:
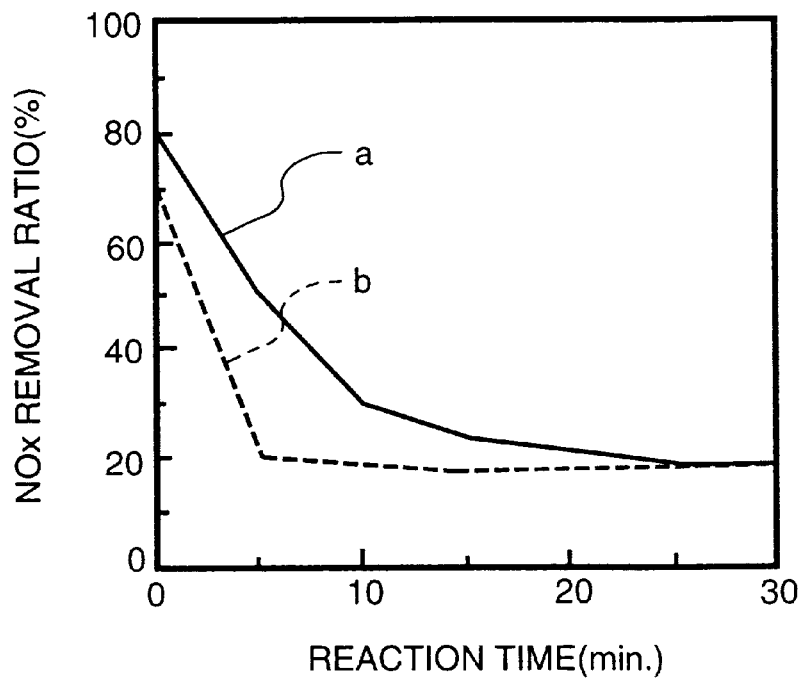
FIG. 1 is a graph showing changes as time lapses of NOx removal rate of catalysts 1 and 2.

The present invention will be explained more in detail hereunder through description of embodiments thereof. The present invention is not limited to the described embodiments, but can be modified within the spirit of the present invention set forth in the appended claims.

Embodiment 1

γ-alumina of particle diameter 1 mm to 2 mm was impregnated with a cerium nitrate solution, then dried at a temperature of about 100° C. for 2 hours and then calcined at a temperature of about 600° C. for 2 hours. Next, this γ-alumina containing cerium was impregnated with a strontium nitrate solution, then dried at a temperature of about 100° C. for 2 hours and then calcined at a temperature of about 600° C. for 2 hours. Further, it was impregnated with a dinitrodiamine platinum nitrate solution, then dried at a temperature of about 100° C. for 2 hours and then calcined at a temperature of about 600° C. for 2 hours, whereby a catalyst 1 containing platinum of 1.6 by wt ratio, strontium of 30 by wt ratio and cerium of 12 by wt ratio, per γ-alumina of 100 by wt ratio, is obtained. Unless specifically indicated otherwise drying at a temperature of about 100° C. for 2 hours and calcining at a temperature of about 600° C. for 2 hours are simply referred to as "drying" and "calcining", respectively, hereunder.

By the same method the one uses for preparation of the catalyst 1 except that the strontium nitrate solution was replaced by a lanthanum nitrate solution, a catalyst 2 is prepared, which contains platinum of 1.6 by wt ratio, lanthanum of 23 by wt ratio and cerium of 12 by wt ratio, per γ-alumina of 100 by wt ratio.

By impregnating the above-mentioned catalyst 1 with a rhodium nitrate solution, drying it and then calcining it, a catalyst 3 was obtained which contains platinum of 1.6 by wt ratio, strontium of 30 by wt ratio, cerium of 12 by wt ratio and rhodium of 0.1 by wt ratio, per γ-alumina of 100 by wt ratio.

By the same method the one used for preparation of the catalyst 1, except that platinum is not used, a comparative catalyst 1 was prepared which contains strontium of 30 by wt ratio and cerium of 12 by wt ratio, per γ-alumina of 100 by wt ratio.

Further, by using palladium nitrate instead of rhodium nitrate in the same method as the one used for preparation of the catalyst 3, a comparative catalyst 2 was obtained which contains platinum of 1.6 by wt ratio, strontium of 30 by wt ratio, cerium of 12 by wt ratio and palladium of 0.1 by wt ratio, per γ-alumina of 100 by wt ratio.

The contents of the catalysts prepared in accordance with the above-mentioned method are shown in table 1.

TABLE 1

|  | Noble metal | Alkaline earth metal | Rare earth metal |
|---|---|---|---|
| Catalyst 1 | Pt | Sr | Ce |
| Catalyst 2 | Pt | Sr | La |
| Catalyst 3 | Rh, Pt | Sr | Ce |
| Comparative catalyst 1 | — | Sr | Ce |
| Comparative catalyst 2 | Pd, Pt | Sr | Ce |

EXPERIMENT EXAMPLE 1

The above catalysts each were subjected to a nitrogen oxide purifying performance test under the following conditions:

A catalyst of 3 cm$^3$ was filled in a Pyrex glass reaction tube having an outer diameter of 20 mm, an inner diameter of 18 mm and a length of 1 m to a position of about ⅔ from the top of the tube. A Rasching ring was arranged upstream of the catalyst, and a reaction gas was caused to flow into a catalytic bed after being warmed sufficiently. This was heated from outside by an electric furnace to 150° C., and then a mixture gas, as a model of exhaust gas containing little oxygen, consisting of NOx of 0.1 vol %, $C_3H_6$ of 0.05 vol %, CO of 0.6 vol %, $O_2$ of 0.5 vol %, $CO_2$ of 12 vol %, $H_2$ of 0.2 vol % and nitrogen being the remaining, which mixture gas is referred to as a stoichiometric model exhaust gas hereunder, was caused to flow at a rate of 3 liter/minute, further steam of 10 vol % was added to the mixture gas, the temperature of the mixture gas is raised to 500° C. at rate of 10° C./minute and a reaction carried out. The concentration of NOx in the exhaust gas at an outlet of the catalyst was measured by a chemiluminescence method, and the NOx removal rate for the stoichiometric model exhaust gas was calculated. The NOx removal rate is defined by the following equation, that is, the NOx removal rate is a value given by dividing the NOx concentration decreased by a catalyst by the NOx concentration at the catalyst inlet:

$$NOx \text{ removal rate}=(A-B)/A\times100$$

wherein A is the NOx concentration in the inlet exhaust gas and B is the NOx concentration in the outlet exhaust gas.

NOx removal rates at the temperatures of three representative 3 points, obtained by the above test, of each of the catalysts in the table 1 are listed in table 2. 250° C., 300° C. and 400° C. in table 2 each are an exhaust gas temperature at the catalyst inlet.

Next, each catalyst was cooled to room temperature, then heated from the outside by the electric furnace to 150° C. again, and then a gas, as a model of exhaust gas containing oxygen, which contains NOx of 0.06 vol %, $C_3H_6$ of 0.04 vol %, CO of 0.1 vol %, $CO_2$ of 10 vol %, $O_2$ being 5.0 vol % and nitrogen of the remaining, which gas is referred to as lean model exhaust gas hereunder, was caused to flow at a rate of 3 liter/minute, further steam of 10 vol % was added thereto and the temperature of the gas was raised to 500° C. at rate of 10° C./minute and a reaction carried out. As in the stoichiometric model exhaust gas, the relationships between exhaust gas temperature at the catalyst inlet and the NOx removal rates were obtained. The results are shown in table 2.

TABLE 2

|  | Stoichiometric NOx removal rate (%) | | | Lean NOx removal rate (%) | | |
|---|---|---|---|---|---|---|
| Temperature (° C.) | 250 | 300 | 400 | 250 | 300 | 400 |
| Catalyst 1 | 10 | 30 | 100 | 50 | 75 | 28 |
| Catalyst 2 | 8 | 26 | 100 | 30 | 30 | 23 |
| Catalyst 3 | 70 | 95 | 100 | 30 | 45 | 25 |
| Comparative catalyst 1 | 3 | 5 | 10 | 2 | 8 | 15 |
| Comparative catalyst 2 | 40 | 95 | 100 | 25 | 10 | 5 |

As is apparent from the table 2, the catalysts 1 to 3 each present a high NOx removal rate from a low temperature for the lean model exhaust gas. The NOx removal rate decreases as the exhaust gas temperature increases, which is considered to be due to the fact that hydrocarbons included in the exhaust gas and effecting reduction reaction are burnt at a high temperature so as to be decreased.

The catalyst 1 has a better NOx removal rate for the lean model exhaust gas than the catalyst 2, from which it is found that it is preferable to use cerium as a rare earth metal than lanthanum. Further, from the test result of the catalyst, it is noted that, when the catalyst includes rhodium, the NOx removal rate of the lean model exhaust gas decreases a little, however, the NOx removal rate of the stoichiometric model exhaust gas can be increased greatly.

Further, the comparative catalyst 1 which contains only strontium and cerium, but does not contain platinum, has a lower NOx removal rate for both the lean model exhaust gas and the stoichiometric model exhaust gas. The comparative catalyst 2, which contains palladium as a noble metal has a lower NOx removal rate for the lean model exhaust gas, therefore, the catalyst which has palladium can not attain an effect of the present invention.

EXPERIMENT EXAMPLE 2

Using each of the above-mentioned catalysts, purification performance tests were conducted under the following conditions:

A catalyst of 3 cm$^3$ was filled in a Pyrex glass reaction tube having an outer diameter of 20 mm, inner diameter of 18 mm and a length of 1 m to a position of about ⅔ from the top of the tube. A Rasching ring was arranged upstream of the catalyst, and a reaction gas was caused to flow through a catalytic bed after being warmed sufficiently. This was heated from outside by an electric furnace to 150° C., and then the above-mentioned stoichiometric model exhaust gas was heated to raise the temperature at a rate of 10° C./minute to 550° C. and a reaction carried out, while flowing gas through the bed at a space velocity of 60,000 h$^{-1}$.

After that, the temperature of the catalyst inlet was cooled to 300° C., the lean model exhaust gas was caused to flow under this condition to react continuously and a NOx removal rate was obtained. The method of measuring the NOx concentration and the method of calculating the NOx concentration are the same as used in the experiment example 1.

In FIG. 1, changes in NOx removal rate according to time lapse are shown for the catalysts 1 and 2. The curve (a) represents a change according to time lapse of the NOx removal rate of the catalyst 1 and the curve (b) represents a change according to time lapse of the NOx removal rate of the catalyst 2. In both of the catalysts 1 and 2, the NOx removal rates decrease as time lapses, however, they become fixed after a time lapse of 30 minutes. From FIG. 1, it is noted that the catalyst 1 exhibits higher NOx removal performance than the catalyst 2 for the first 30 minutes of the reaction.

The NOx removal rates just after reaction has occurred for 30 minutes are listed in a table 3.

TABLE 3

|  | NOx removal rate (%) |
| --- | --- |
| Catalyst 1 | 20 |
| Catalyst 2 | 20 |
| Catalyst 3 | 30 |
| Comparative catalyst 1 | 12 |
| Comparative catalyst 2 | 15 |

The catalysts 1, 2 and 3 have a better NOx removal rate than the comparative catalysts 1 and 2 even after a reaction for 30 minutes.

Embodiment 2

Catalysts are prepared by changing the contents of cerium, strontium and platinum of the catalyst 1 within such ranges that cerium is in a range of 0–40 by wt ratio, strontium in a range of 0–50 by wt ratio and platinum in a range of 0–50 by wt ratio, per γ-alumina of 100 by wt ratio.

Using these catalysts, the NOx removal rate at a catalyst inlet temperature of 300° C. of the lean model exhaust gas was measured according to the experiment example 2. The result is shown in table 4. Numeral values set forth in the frame denote NOx removal rate (%).

TABLE 4

| Pt (weight ratio) | Sr (weight ratio) | Ce (weight ratio) | | | | |
| --- | --- | --- | --- | --- | --- | --- |
| | | 0 | 3 | 12 | 30 | 40 |
| 0.0 | 0 | 3 | 4 | 5 | 6 | 3 |
| | 5 | 4 | 5 | 6 | 7 | 4 |
| | 30 | 5 | 5 | 6 | 7 | 5 |
| | 40 | 6 | 6 | 6 | 6 | 5 |
| | 50 | 3 | 3 | 4 | 5 | 3 |
| 0.1 | 0 | 5 | 7 | 8 | 8 | 6 |
| | 5 | 7 | 8 | 9 | 9 | 6 |
| | 30 | 8 | 9 | 10 | 10 | 7 |
| | 40 | 8 | 9 | 11 | 10 | 7 |
| | 50 | 5 | 7 | 7 | 6 | 5 |
| 1.6 | 0 | 7 | 9 | 10 | 9 | 7 |
| | 5 | 9 | 12 | 15 | 9 | 8 |
| | 30 | 12 | 15 | 20 | 16 | 9 |
| | 40 | 10 | 13 | 18 | 14 | 8 |
| | 50 | 8 | 9 | 12 | 10 | 7 |
| 3.0 | 0 | 6 | 8 | 9 | 8 | 4 |
| | 5 | 7 | 9 | 10 | 10 | 5 |
| | 30 | 8 | 10 | 13 | 11 | 5 |
| | 40 | 8 | 9 | 10 | 10 | 4 |
| | 50 | 4 | 7 | 7 | 6 | 3 |
| 4.0 | 0 | 4 | 5 | 6 | 5 | 3 |
| | 5 | 5 | 6 | 6 | 6 | 4 |
| | 30 | 5 | 6 | 5 | 5 | 5 |
| | 40 | 5 | 5 | 4 | 4 | 4 |
| | 50 | 4 | 4 | 3 | 3 | 3 |

From the above table 4, it is noted that a catalyst, containing platinum of 1.6 by wt ratio, strontium of 30 by wt ratio and cerium of 12 by wt ratio, per γ-alumina of 100 by wt ratio, has the highest NOx removal rate.

Next, a catalyst, containing platinum of 1.6 by wt ratio and strontium of 30 by wt ratio, per γ-alumina of 100 by wt ratio and having a different content of cerium, was prepared using the same method as used for the catalyst 1. According to the experiment example 2, the NOx removal rate at a catalyst inlet temperature of 300° C. of the lean model exhaust gas was measured.

Figure 2:
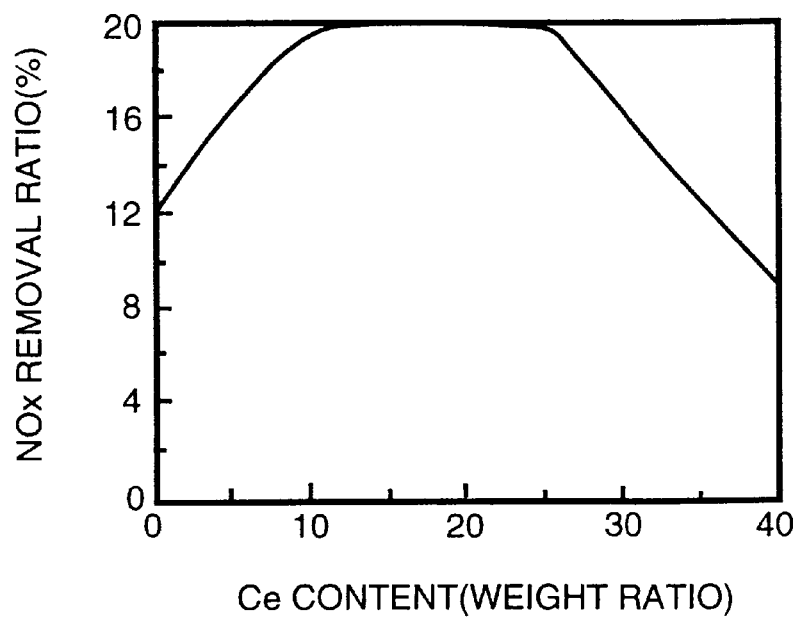
FIG. 2 is a graph showing a relationship between cerium content and NOx removal rate of a catalyst.

In FIG. 2, the relationship between the content of cerium and the NOx removal rate is shown. From FIG. 2, it is noted that the NOx removal rate can be 12% or more when the content of cerium is 0.01–36 by wt ratio per γ-alumina of 100 by wt ratio, 14% or more when the content of cerium is 2.0–33 by wt ratio per γ-alumina of 100 by wt ratio, and 18% or more when the content of cerium is 7.0–28 by wt ratio per γ-alumina of 100 by wt ratio.

In the same manner, catalysts containing platinum of 1.6 by wt ratio and cerium of 12 by wt ratio, per γ-alumina of 100 by wt ratio, and having different contents of strontium, were prepared. According to the experiment example 2, the NOx removal rate at a catalyst inlet temperature of 300° C. of the lean model exhaust gas was measured.

Figure 3:
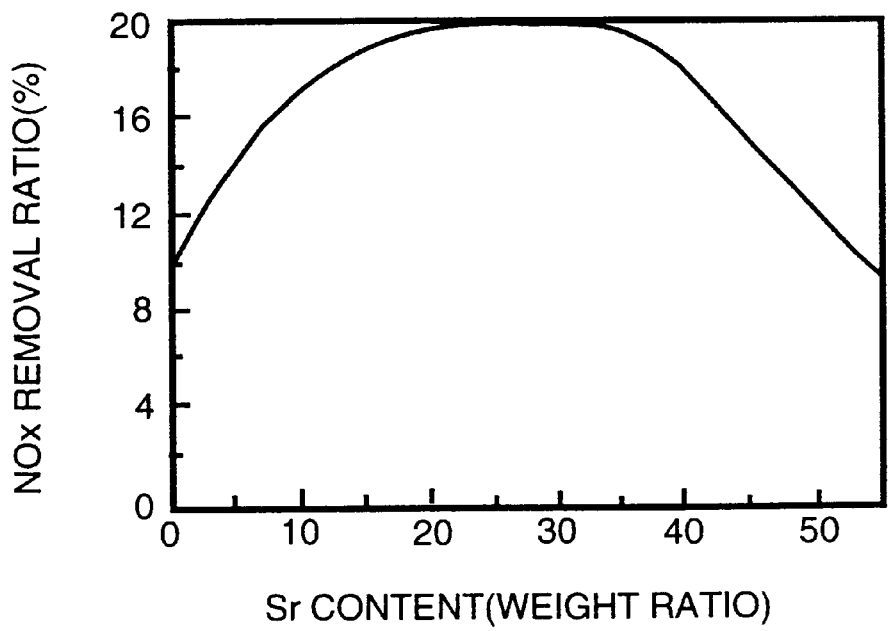
FIG. 3 is a graph showing a relationship between strontium content and NOx removal rate of a catalyst.

In FIG. 3, the relationship between the content of strontium and the NOx removal rate is shown. From FIG. 3, it is noted that the NOx removal rate can be 10% or more when the content of strontium is 0.01–55 by wt ratio per γ-alumina of 100 by wt ratio, 14% or more when the content of cerium is 5.0–47 by wt ratio per γ-alumina of 100 by wt ratio, and 18% or more when the content of cerium is 12–40 by wt ratio per γ-alumina of 100 by wt ratio.

In the same manner, catalysts containing strontium of 30 by wt ratio and cerium of 12 by wt ratio per γ-alumina of 100 by wt ratio, and having different contents of platinum, were prepared. According to the experiment example 2, the NOx removal rate at a catalyst inlet temperature of 300° C. of the lean model exhaust gas was measured.

Figure 4:
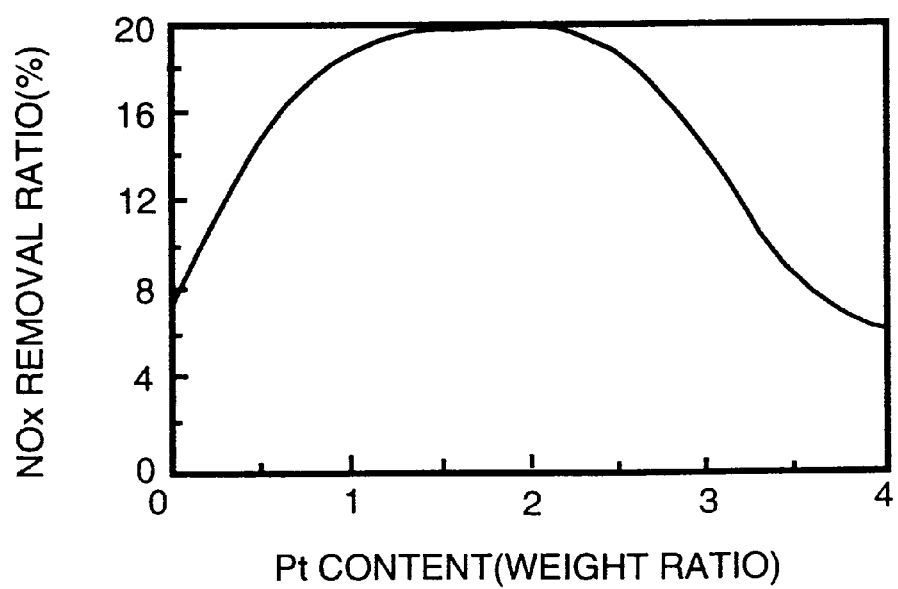
FIG. 4 is a graph showing a relationship between platinum content and NOx removal rate of a catalyst.

In FIG. 4, the relationship between the content of platinum and the NOx removal rate is shown. From FIG. 4, it is noted that the NOx removal rate can be 7.5% or more when the content of platinum is 0.01–3.7 by wt ratio per γ-alumina of 100 by wt ratio, 14% or more when the content of platinum is 0.4–3.0 by wt ratio per γ-alumina of 100 by wt ratio, and 18% or more when the content of platinum is 0.9–2.6 by wt ratio per γ-alumina of 100 by wt ratio.

Embodiment 3

After calcining the catalyst 1 in air at a temperature of 700° C. or 850° C. for 5 hours, the NOx removal rate in a programmed temperature reaction of the lean model exhaust gas was measured in the same manner as in the experiment example 1. The results are shown in table 5.

TABLE 5

| | NOx removal rate (%) at each temp. | | | |
|---|---|---|---|---|
| | 250° C. | 300° C. | 350° C. | 400° C. |
| Calcining at 700° C. | 35 | 58 | 60 | 35 |
| Calcining at 850° C. | 25 | 35 | 50 | 30 |

From table 5, it is noted that the catalyst 1 exhibits a high NOx removal rate and has an excellent heat resistance even if the catalyst is calcined at a high temperature.

Embodiment 4

Catalysts, in which the content of rhodium per γ-alumina of 100 by wt ratio is changed in a range of 0–0.4 by wt ratio, were prepared using the same preparation method as used for the catalyst 3, and programmed temperature reaction was conducted in the same manner as in the experiment example and the NOx removal rate was obtained. The NOx removal rates (%) measured at each temperature of the stoichiometric model exhaust gas and the lean model exhaust gas are listed in table 6.

TABLE 6

| Rh content (weight ratio) | Stoichiometric NOx removal rate | | Lean NOx removal rate | |
|---|---|---|---|---|
| | 250° C. | 300° C. | 300° C. | 350° C. |
| 0.0 | 10 | 30 | 75 | 60 |
| 0.02 | 35 | 55 | 65 | 55 |
| 0.3 | 80 | 100 | 45 | 45 |
| 1.0 | 90 | 100 | 40 | 35 |
| 1.4 | 95 | 100 | 20 | 25 |

From table 6, it is noted that the NOx removal rate of stoichiometric ratio combustion exhaust gas can be raised by the use of rhodium of 0.02 by wt ratio or more and 1.4 by wt ratio or less per γ-alumina of 100 by wt ratio, without significantly decreasing the NOx removal rate of the lean burn exhaust gas.

Embodiment 5

Catalysts 4 to 6 were prepared which have the same composition and content as those of the catalyst 1, but the sequence of impregnation was changed as indicated in table 7. Catalysts 7 to 9 were prepared which have the same composition and content as those of the catalyst 3, but the sequence of impregnation were changed as indicated in table 7.

The NOx removal rate at a catalyst inlet temperature of 300° C. of the lean model exhaust gas was measured for those catalysts 4 to 6 and 7 to 9 in the same manner as in the experiment example 2. The results are listed in the table 7 together with the values of catalysts 1 and 3.

TABLE 7

| Impregnation sequence | 1 | 2 | 3 | 4 | NOx removal rate (%) |
|---|---|---|---|---|---|
| Catalyst 1 | Ce | Sr | Pt | | 20 |
| Catalyst 4 | Ce | Pt | Sr | | 15 |
| Catalyst 5 | Sr | Pt | Ce | | 10 |
| Catalyst 6 | Sr | Ce | Pt | | 13 |
| Catalyst 3 | Ce | Sr | Pt | Rh | 30 |
| Catalyst 7 | Ce | Sr | Rh | Pt | 27 |
| Catalyst 8 | Ce | Rh | Sr | Pt | 22 |
| Catalyst 9 | Rh | Ce | Sr | Pt | 20 |

From comparison of the test results of the catalysts 1, 4, 5 and 6, it is noted that the impregnation sequence of components in the catalyst comprising a rare earth metal, such as cerium, strontium and platinum, is preferably in the following order: rare earth metal, strontium and platinum. Further, it is noted that the sequence of impregnation of components in the catalyst comprising a rare earth metal, such as cerium, strontium, platinum and rhodium, is preferably in the following order, rare earth metal: strontium, platinum and rhodium.

Embodiment 6

Figure 5A:
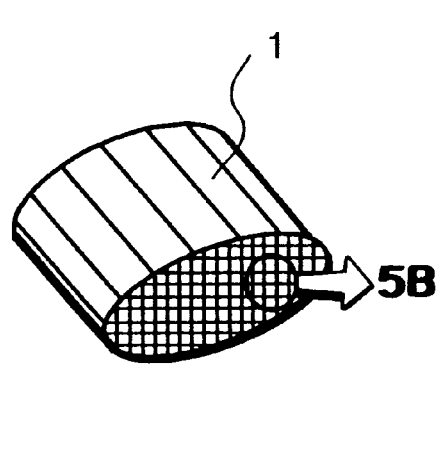
FIG. 5 is a perspective view of a honeycomb catalyst.
Figure 5B:
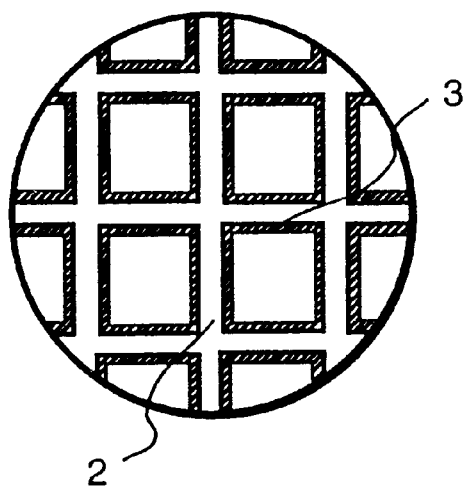

After cerium nitrate crystal was mixed with γ-alumina of particle diameter 6 μm and treated by dry kneading, wet kneading was effected, with pure water added thereto. The kneaded substance was dried and then calcined. In the same manner, strontium nitrate crystal and a dinitrodiamine platinum nitrate solution, in the above-mentioned order, each were subjected to impregnation, drying and calcining. By this method, a catalyst 10, containing platinum of 1.6 by wt ratio, strontium of 30 by wt ratio and cerium of 12 by wt ratio, per γ-alumina of 100 by wt ratio, was obtained. The catalyst 10 was wash-coated to 100 g/liter on cordierite honeycomb (400 cells/in$^2$), and then drying and calcining were conducted, whereby a catalyst 11 was obtained. The outside of the catalyst 11 is shown in FIG. 5. The honeycomb catalyst 1 comprises a honeycomb portion 2 and a catalyst portion 3. The catalyst portion 3 is coated on the honeycomb portion 2.

Further, after cordierite honeycomb (400 cells/in$^2$) were coated with γ-alumina of particle diameter 6 μm 100 g/liter, drying and calcining were conducted. After the honeycomb was impregnated with cerium nitrate solution, drying and calcining were conducted. In the same manner, the honeycomb containing cerium was impregnated with strontium and then platinum in this order, whereby a catalyst 12 was produced.

The honeycomb volume of each of the catalysts 11 and 12 was made to be 6 cc, and the NOx removal rate at a catalyst inlet temperature of 300° C. of the lean model exhaust gas was measured in the same manner as in the experiment example 2. The result is shown in table 8.

TABLE 8

| Temperature (° C.) | 250 | 280 | 350 | 400 |
|---|---|---|---|---|
| Catalyst 11 | 40 | 60 | 35 | 20 |
| Catalyst 12 | 25 | 30 | 15 | 5 |

From table 8, it is noted that the exhaust gas purifying catalyst, produced by a production method of coating fine particles of alumina supporting catalytic components on a cordierite honeycomb, has a higher performance than an exhaust gas purifying catalyst produced by a method of supporting catalytic components after coating fine particles of alumina on a cordierite honeycomb.

After cerium nitrate crystal was mixed with γ-alumina of particle diameter 6 μm to effect dry kneading, wet kneading was effected, with a predetermined amount of pure water added thereto. The kneaded substance was dried and then calcined. In the same manner, impregnation of a dinitrodiamine platinum nitrate solution, a rhodium nitrate solution and finally magnesium nitrate crystal was effected in the above-mentioned order, and then drying and calcining were conducted. By this method, a catalyst 13, containing magnesium of 0.2 by wt ratio, rhodium of 0.3 by wt ratio, platinum of 1.6 by wt ratio and cerium of 12 by wt ratio, per γ-alumina of 100 by wt ratio was obtained. The catalyst 13 was wash-coated to 100 g/liter on cordierite honeycomb (400 cells/in$^2$), and then drying and calcining were conducted, whereby a catalyst 14 was obtained.

The catalyst 14 of 6 cm$^3$ was filled in a Pyrex reaction tube, and the catalyst 11 was filled thereon, whereby a catalyst 15 was produced.

A test similar to the experiment example 1 was conducted on the catalysts 14 and 15, and the NOx removal rate in a programmed temperature reaction was measured. The result is listed in table 9.

TABLE 9

| Temperature (° C.) | Stoichiometric NOx removal rate | | | Lean NOx removal rate | | |
| --- | --- | --- | --- | --- | --- | --- |
| | 250 | 300 | 400 | 300 | 350 | 400 |
| Catalyst 14 | 80 | 100 | 100 | 35 | 23 | 20 |
| Catalyst 15 | 75 | 100 | 100 | 60 | 50 | 20 |

The catalyst 14 has a lower NOx removal rate of the lean model exhaust gas than the catalyst 11, however it has a sufficient NOx removal performance for the stoichiometric model exhaust gas. The catalyst 15 produced by combining the catalysts 14 and 11 is improved greatly with respect to the NOx removal performance for the stoichiometric model exhaust gas in addition to improvement of the NOx removal performance for the lean model exhaust gas, from which it is noted that it is extremely effective to combine the two kinds of catalysts.

Embodiment 8

After the catalyst 13 was wash-coated to 50 g/liter on cordierite honeycomb (400 cells/in$^2$), drying and calcining were conducted. Further, the catalyst 10 is wash-coated to 50 g/liter on cordierite honeycomb, and then drying and calcining were conducted, whereby a catalyst 16 was obtained.

The honeycomb volume of 6 cm$^3$ of the catalyst 16 was filled in a Pyrex reaction tube. A test similar to the experiment example 1 was conducted thereon and the NOx removal rate in a programmed temperature reaction was measured.

For comparison, a typical honeycomb three-way catalyst of the type which is on the market are taken as a comparative catalyst 3, which contains cerium oxide of 10 by wt ratio, platinum of 1.6 by wt ratio and rhodium of 0.3 by wt ratio, per γ-alumina of 100 by wt ratio, and the measurement results are shown in table 10 with those of the catalyst 16.

TABLE 10

| Temperature (° C.) | Stoichiometric NOx removal rate (%) | | | Lean NOx removal rate (%) | | |
| --- | --- | --- | --- | --- | --- | --- |
| | 250 | 300 | 400 | 300 | 350 | 400 |
| Catalyst 14 | 73 | 100 | 100 | 60 | 45 | 20 |
| Compar. catalyst 3 | 60 | 95 | 100 | 20 | 15 | 10 |

Embodiment 9

In the catalyst arrangement described in the embodiments 7 and 8, the lean model exhaust gas and the stoichiometric model exhaust gas were caused to flow through, each for one minute, with the catalyst inlet temperature being kept constant, and the NOx removal rates therefor were measured.

Figure 6:
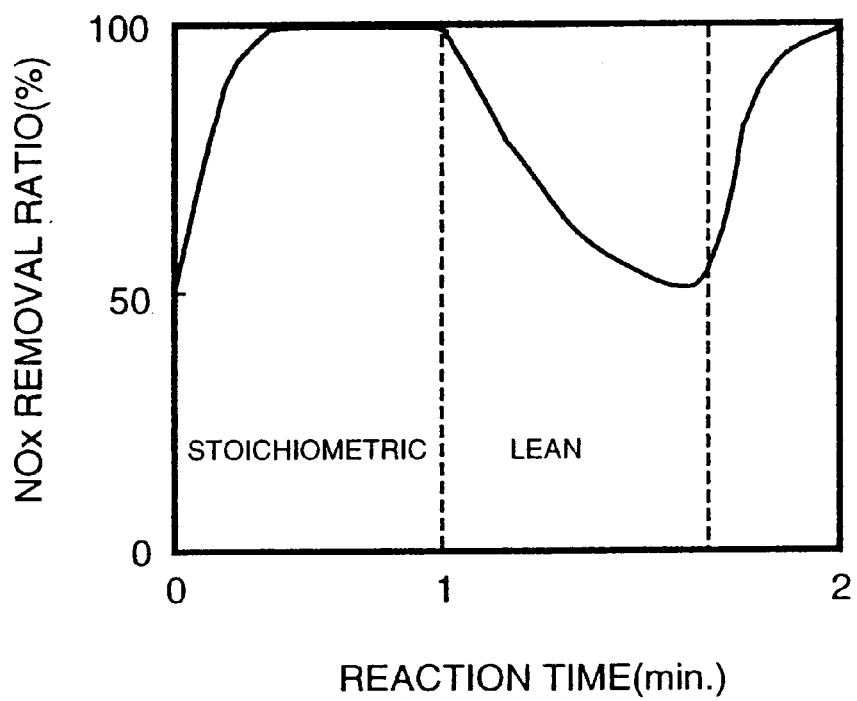

Under operation conditions close to practical operation conditions of vehicles, the NOx removal rate are about 100% for the stoichiometric model exhaust gas and 50–100% for the lean model exhaust gas, as shown in FIG. 6. The process was repeatedly carried out.

Embodiment 10

The catalyst 10 and catalyst 13 were mixed at a weight ratio of 1:1 and dry-kneaded, molded and then calcined. The compact is formed in the form of particles of particle diameter 1–2 mm, whereby a catalyst 17 was obtained.

Further, a rhodium nitrate solution was mixed with the catalyst 10, kneaded, dried and then calcined, whereby a catalyst 18, containing cerium of 12 by wt ratio, strontium of 30 by wt ratio, platinum of 1.6 by wt ratio and rhodium of 0.3 by wt ratio, per γ-alumina of 100 by wt ratio was obtained.

The catalyst 18 and catalyst 13 were mixed at a weight ratio of 1:1 and dry-kneaded, molded and then calcined. The compact is formed in the form of particles of particle diameter 1–2 mm, whereby a catalyst 19 was obtained.

According to the experiment example 1, the NOx removal rates of the stoichiometric model exhaust gas and the lean model exhaust gas in a programmed temperature reaction were measured. The results are shown in table 11.

TABLE 11

| Temperature (° C.) | Stoichiometric NOx removal rate (%) | | | Lean NOx removal rate (%) | | |
| --- | --- | --- | --- | --- | --- | --- |
| | 250 | 300 | 400 | 300 | 350 | 400 |
| Catalyst 10 | 10 | 30 | 100 | 50 | 75 | 28 |
| Catalyst 17 | 85 | 100 | 100 | 55 | 70 | 23 |
| Catalyst 18 | 80 | 100 | 100 | 30 | 45 | 45 |
| Catalyst 19 | 85 | 100 | 100 | 30 | 45 | 23 |

The table 11 shows that the combination with the catalyst 13 improves the NOx removal rate of the stoichiometric model exhaust gas without lowering the NOx removal rate of the lean model exhaust gas. Therefore, by this combination, a high NOx removal performance can be attained both for lean burn exhaust gas and for stoichiometric ratio combustion exhaust gas.

Embodiment 11

According to the embodiment 10, catalysts 20, 21, 22 and 23 were prepared by combining the catalyst 13 and the catalyst 10 at weight ratios of 1:4, 1:2, 2:1 and 4:1, respectively.

According to the experiment example 1, NOx removal rates of the stoichiometric model exhaust gas and the lean model exhaust gas in a programmed temperature reaction were measured. The results are shown in table 12 together with the test result of the catalyst 17 in which the catalysts 10 and 13 were combined at a weight ratio of 1:1.

TABLE 12

|  | Stoichiometric NOx removal rate (%) | | | Lean NOx removal rate (%) | | |
| --- | --- | --- | --- | --- | --- | --- |
| Temperature (° C.) | 250 | 300 | 400 | 300 | 350 | 400 |
| Catalyst 20 | 30 | 60 | 100 | 50 | 73 | 23 |
| Catalyst 21 | 75 | 100 | 100 | 52 | 75 | 24 |
| Catalyst 17 | 85 | 100 | 100 | 55 | 70 | 23 |
| Catalyst 22 | 85 | 100 | 100 | 53 | 60 | 20 |
| Catalyst 23 | 85 | 100 | 100 | 55 | 40 | 15 |

From the test results, it is noted that a weight ratio of the catalyst 10 and the catalyst 13 is preferable in a range of 1:4 to 4:1, and more preferable in a range of 1:2 to 2:1.

Embodiment 12

After the catalyst 10 and catalyst 13 were mixed at a weight ratio of 1:1 and dry-kneaded, the mixture was calcined. The calcined mixed catalytic powder was washcoated to 100 g/liter on a cordierite honeycomb (400 cells/in$^2$), dried and calcined, whereby a catalyst 24 was obtained. The catalyst 24 of volume 6 cm$^3$ was filled in a Pyrex reaction tube. A test similar to the experiment example 1 was conducted thereon and the NOx removal rates of the lean model exhaust gas and the stoichiometric model exhaust gas in a programmed temperature reaction were measured. As is noted from the test results shown in table 13, the catalyst 24 carries out has an excellent NOx removal performance both for the stoichiometric model exhaust gas and for the lean model exhaust gas.

TABLE 13

|  | Stoichiometric NOx removal rate (%) | | | Lean NOx removal rate (%) | | |
| --- | --- | --- | --- | --- | --- | --- |
| Temperature (° C.) | 250 | 300 | 400 | 300 | 350 | 400 |
| Catalyst 24 | 65 | 100 | 100 | 35 | 55 | 12 |

Embodiment 13

In the catalyst arrangement described in the embodiment 12, the lean model exhaust gas and the stoichiometric model exhaust gas were caused to alternately flow through, each for one minute, with the catalyst inlet temperature being kept at 300° C., and the NOx removal rates therefor were measured.

The NOx removal rate is about 100% for the stoichiometric model exhaust gas and 45–100% for the lean model exhaust gas. The process was repeatedly carried out.

Embodiment 14

Using the catalyst 24 of honeycomb volume 1.7 liter, a 10–15 mode running test of a practical vehicle was conducted, wherein a back measurement was carried out for a total exhaust amount of NOx, a total exhaust amount of hydrocarbon and a total exhaust amount of CO. The test apparatus was a gasoline vehicle having a 3000 cc displacement engine disposed on a chassis dynamometer. Two of the honeycombs were arranged in series in an exhaust gas duct under a floor of the vehicle. As for the test conditions, a lean burn operation was taken at a high speed running time of the vehicle, and then hot starting was taken for which the 10–15 mode test was continuously conducted.

As for the test results, the total amount of exhausted NOx was 0.098 g/km, while the Japanese regulation value is 0.25 g/km, the total amount of exhausted hydrocarbon was 0.109 g/km, while the Japanese regulation value is 0.25 g/km, and the total amount of exhausted CO was 0.110 g/km, while the Japanese regulation value is 2.1 g/km. Thus, the Japanese regulation values are sufficiently satisfied.

According to the present invention, harmful substances, particularly NOx, even in exhaust gas containing oxygen can be purified effectively.

What is claimed is:

1. An exhaust gas purifying method for purifying nitrogen oxides, hydrocarbons and carbon monoxides contained in an exhaust gas from an internal combustion engine of a vehicle operated at a stoichiometric ratio and at an air fuel ratio higher than the stoichiometric ratio and having excessive oxygen, comprising:

contacting exhaust gas with either a catalytic mixture in which first and second catalysts are mixed, or a catalytic structure formed by coating said second catalyst on a surface of a base of cordierite honeycomb and coating said first catalyst on the honeycomb coated with said second catalyst, wherein said first catalyst consists essentially of a support of inorganic oxide, and platinum or platinum oxide, strontium or strontium oxide, rare earth metal or rare earth metal oxide, and optionally containing rhodium or rhodium oxide, wherein said first and second catalysts are supported on said support of inorganic oxide, said second catalyst consisting essentially of a support of inorganic oxide and Rh, Pt, Mg and Ce as active components each supported on said support of inorganic oxide, wherein a weight ratio between said first and second catalysts is 1:4 to 4:1, and wherein the components of said first catalyst are platinum 0.01–3.7 by wt ratio, rhodium 0.02–1.4 by wt ratio, strontium 0.01–55 by wt ratio, the rare earth metal 0.01–36 by wt ratio per the inorganic oxide 100 by wt ratio.

2. An exhaust gas purifying method according to claim 1, wherein said rare earth metal is at least one element selected from a group consisting of cerium and lanthanum.

3. An exhaust gas purifying method according to claim 1, wherein said inorganic oxide is aluminum oxide.

4. An exhaust gas purifying catalyst for purifying nitrogen oxides, hydrocarbons and carbon monoxides contained in an exhaust gas from an internal combustion engine of a vehicle operated at a stoichiometric ratio and at an air fuel ratio higher than the stoichiometric ratio and having excessive oxygen, comprising:

a mixture of first and second catalysts, said first catalyst consisting essentially of a support of inorganic oxide, and platinum or platinum oxide, strontium or strontium oxide, rare earth metal or rare earth metal oxide, and optionally containing rhodium or rhodium oxide, wherein said first and second catalysts are supported on said support of inorganic oxide, and said second catalyst consisting essentially of a support of inorganic oxide and Rh, Pt, Mg and Ce as active components each supported on said support of inorganic oxide, or a catalytic structure formed by coating said second catalyst on a surface of a base of cordierite honeycomb and coating said first catalyst on the honeycomb coated with said second catalyst;

wherein a weight ratio between said first and second catalysts is 1:4 to 4:1; and wherein the components of said first catalyst are platinum 0.01–3.7 by wt ratio, rhodium 0.02–1.4 by wt ratio, strontium 0.01–55 by wt ratio, the rare earth metal 0.01–36 by wt ratio per the inorganic oxide 100 by wt ratio.

5. An exhaust gas purifying catalyst according to claim 4, wherein said rare earth metal is at least one element selected from a group consisting of cerium and lanthanum.

6. An exhaust gas purifying catalyst according to claim 4, wherein said inorganic support is aluminum oxide.

* * * * *